3,043,858
SILALKYLTIN COMPOUNDS

Robert L. Merker, Pittsburgh, Pa., assignor to Dow Corning Corporation, Midland, Mich., a corporation of Michigan
No Drawing. Filed Aug. 28, 1958, Ser. No. 757,659
7 Claims. (Cl. 260—429.7)

The present invention relates to monomeric silalkyltin compounds of the formula $$[YR_2SiCH_2(CHZ)_n(CH_2)_m]_{4-x}SnR'_x$$

where each R is a monovalent hydrocarbon radical, each R' is selected from the group consisting of alkyl and phenyl radicals, Y is hydrogen, Z is selected from the group consisting of hydrogen and the methyl radical, $x$ is an integer of from 1 to 2 inclusive, $m$ is an integer of from 0 to 1 inclusive, and $n$ is an integer of from 0 to 1 inclusive and is 1 only when $m$ is 1.

Since $n$ in the above definition can be 1 only when $m$ is 1, it will be seen that the alkylene groups which can link the silicon atoms to the tin atoms will be either $-CH_2-$, $-CH_2CH_2-$, $-(CH_2)_3-$, or $$-CH_2CH(CH_3)CH_2-$$

groups.

The compounds can be prepared by the reaction of the corresponding Grignard reagent, i.e.

$$HR_2SiCH_2(CHZ)_n(CH_2)_mMgCl$$

or the corresponding bromide or iodide, with the appropriate organotin halide, e.g. $R'_xSnCl_{4-x}$ and the corresponding bromides. If desired, products containing different $[YR_2SiCH_2(CHZ)_n(CH_2)_m]$ groups attached to a single Sn atom can be prepared by employing a mixture of the different Grignard reagents. Preferably an amount of the Grignard reagent equivalent to all of the tin-bonded halogen atoms or in slight excess thereof is employed in this reaction, and conventional conditions for Grignard "coupling" reactions can be used.

In the above products and reactants each R can be any monovalent hydrocarbon radical and each can be the same or different from its fellow radicals. Examples of suitable R radicals include alkyl radicals such as methyl, ethyl, propyl and octadecyl; aryl radicals such as phenyl, xenyl, and naphthyl; alkaryl radicals such as tolyl and xylyl; aralkyl radicals such as benzyl; alkenyl and alkynyl radicals such as vinyl, allyl, propynyl and cyclohexenyl; and cycloaliphatic radicals such as cyclohexyl. Preferably R is methyl, ethyl, or phenyl. Each R' radical is an alkyl or phenyl radical and where more than 1 such radical is present on a particular Sn atom the radicals can be the same or different. Suitable R' radicals include methyl, ethyl, propyl, isopropyl, butyl, isobutyl, and octyl radicals. The most preferred R' radicals are those alkyl radicals having from 1 to 4 inclusive carbon atoms in a straight chain.

The Grignard reagents referred to above are easily prepared in excellent yield by the conventional techniques for the preparation of Grignard reagents. Thus, a compound of the formula $HR_2SiCH_2(CHZ)_n(CH_2)_mCl$ or the corresponding bromide is ordinarily diluted with diethyl ether or tetrahydrofuran and intimately contacted with magnesium shavings. The necessary haloalkyldiorganosilane can be prepared by the reduction of the corresponding haloalkyldiorganohalosilane, e.g.

$$ClCH_2(CHZ)_n(CH_2)_mSiR_2Cl$$

with LiAlH$_4$. This reduction is carried out in essentially the same manner as that illustrated by Nebergall in J.A.C.S., 72, 4702 (1950). Generally, an equivalent amount of the LiAlH$_4$ is employed as a solution in ether or tetrahydrofuran and the reaction proceeds by merely contacting the two reactants. Where the haloalkyl group is a halomethyl group, the reaction is best conducted at about room temperature in order to avoid attack on that halogen. With increasing length of the alkylene chain, however, the reaction can be carried out at the reflux temperature of the solvent without undue attack upon the alkylene bonded halogen.

The necessary intermediates such as $$ClCH_2(CHZ)_n(CH_2)_mSiR_2Cl$$

are known compounds. They can be produced, for example, by halogenating CH$_3$SiCl$_3$ and then replacing two of the silicon-bonded halogen atoms by the conventional Grignard reaction with a RMgCl compound, or, when longer alkylene chains are desired, by reacting allyl chloride, methallyl chloride, or vinyl chloride with a compound of the formula R$_2$HSiCl in the presence of a catalyst such as chloroplatinic acid to produce the corresponding adduct. If desired the latter well-known addition reaction can be modified by employing RHSiCl$_2$ or HSiCl$_3$ in place of the R$_2$HSiCl, in which case the necessary additional R radical or radicals can then be attached by Grignardizing all but one of the silicon-bonded chlorine atoms.

The necessary organotin halide reactants are of coure well-known materials. Suitable examples include MeSnCl$_3$, MeSnBr$_3$, PhSnCl$_3$, Bu$_2$SnCl$_2$, Me$_2$SnCl$_2$, Et$_2$(i-Bu)SnBr, Et$_2$PrSnBr, (i-Pr)$_2$SnCl$_2$, Ph$_2$SnBr$_2$, and PhMeSnCl$_2$. The symbols Me, Et, Pr, i-Pr, Bu, and Ph are used above and throughout this specification as representative of methyl, ethyl, propyl, isoproyl, butyl and phenyl radicals respectively.

The products of this invention can be hydrolyzed to produce the corresponding cyclic or linear polymeric siloxanes, or cohydrolyzed with conventional organohalosilanes of the formula R''$_t$SiCl$_{4-t}$ where R'' is any monovalent hydrocarbon or halogenated monovalent hydrocarbon radical and $t$ is an integer of from 1 to 3 inclusive, to produce copolymeric siloxanes containing the siloxane units derivable from each of the starting monomers. The polymers and copolymers referred to above are described in detail in my copending application Serial No. 757,660 entitled "Silalkyltin Siloxanes" filed concurrently herewith (issued as Patent No. 2,956,045 on October 11, 1960).

A major utility of the product of this invention lies in their use as intermediates in the preparation of the aforesaid polymers and copolymers, which are in turn useful as lubricating oils and hydraulic fluids, and as additives to conventional organosiloxane fluids to improve their lubricating properties. The compounds are also useful as reactants with organosilicon compounds containing silicon-bonded vinyl or allyl radicals by means of a typical addition reaction in the presence of a catalyst such as chloroplatinic acid, as is described in greater detail in my copending application Serial No. 757,658 entitled "Tinalkylsilalkyl Organosilicon Compounds" filed concurrently herewith (issued as Patent No. 2,920,060 on January 5, 1960). The SiH containing products also react with organic compounds containing aliphatic unsaturation, e.g. olefins and vinylic, vinylidenic, acrylic, and methacrylic compounds, by means of conventional addition reaction techniques.

Those products of this invention which contain butyl groups attached to tin, and the corresponding siloxane polymers and copolymers derivable therefrom, exhibit antimicrobic properties in respect to gram positive organisms such as *Micrococcus pyogenes* var. *aureus*, as well as antifungal and antimildew properties against such test organisms as *Fusarium oxysporum* (representative of the etiologic agents of "athlete's foot"), and *Asper-*

*gillus flavus* and Penicillum sp., both representative of mildew producing organisms. Thus these products can be used to treat materials such as textiles and leather to provide mildew resistance.

The following examples are illustrative only and are not intended to limit the invention which is properly delineated in the appended claims.

*Example 1*

A solution of 50 g. (0.465 mol) of ClCH$_2$Me$_2$SiH in 150 ml. diethyl ether was added drop-wise to 12.4 g. (0.465 g. atom) magnesium shavings with constant agitation and at a rate such that the reflux temperature of the ether was maintained. To the resulting Grignard reagent there was added drop-wise a solution of 40.8 g. (0.185 mol) Me$_2$SnCl$_2$ in 300 ml. of diethylether. The reaction product was refluxed for one hour, diluted with 100 ml. benzene, washed with an aqueous 5% HCl solution, then washed with water, and dried over anhydrous sodium sulfate. Fractional distillation of the dried solution yielded (HMe$_2$SiCH$_2$)$_2$SnMe$_2$, B. P. 101° C. at 20 mm. Hg, $n_D^{25}$ 1.4743, $d_4^{25}$ 1.108. When the above process is repeated, but using ClCH$_2$PhMeSiH in place of the ClCH$_2$Me$_2$SiH, there is produced the compound (HPhMeSiCH$_2$)$_2$SnMe$_2$.

*Example 2*

Following the method of Example 1, but employing Bu$_2$SnCl$_2$ in place of the Me$_2$SnCl$_2$, there was produced the compound (HMe$_2$SiCH$_2$)$_2$SnBu$_2$, B.P. 130° C. at 5 mm. Hg, $n_D^{25}$ 1.4810, $d_4^{25}$ 1.043.

*Example 3*

A mixture of 25.6 g. (0.0675 mol) of the product from Example 2, 30 g. absolute ethanol, and 0.2 g. sodium was heated under reflux for four hours, during which time the theoretical volume of hydrogen was evolved. The reaction product was neutralized with glacial acetic acid and fractionally distilled to yield the product (Me$_2$EtOSiCH$_2$)$_2$SnBu$_2$, B.P. 186° C. at 15 mm. Hg, $n_D^{25}$ 1.4655, $d_4^{25}$ 1.056.

*Example 4*

The process of Example 1 was repeated, but employing Cl(CH$_2$)$_3$Me$_2$SiH in place of the ClCH$_2$Me$_2$SiH. There was produced the compound [HMe$_2$Si(CH$_2$)$_3$]$_2$SnMe$_2$, B.P. 146° C. at 15 mm. Hg, $n_D^{25}$ 1.4730, $d_4^{25}$ 1.052.

*Example 5*

The process of Example 1 was repeated, but employing Bu$_3$SnCl in place of the Me$_2$SnCl$_2$. There was produced the compound HMe$_2$SiCH$_2$SnBu$_3$, B.P. 133° C. at 5 mm. Hg, $n_D^{25}$ 1.4764, $d_4^{25}$ 1.047. When this compound was alkoxylated with ethanol by the procedure of Example 3, there was produced the compound Me$_2$EtOSiCH$_2$SnBu$_3$, B.P. 147° C. at 5 mm. Hg, $n_D^{25}$ 1.4682, $d_4^{25}$ 1.053.

*Example 6*

When the compound ClCH$_2$CHMeCH$_2$Me$_2$SiH is reacted with magnesium in the manner of Example 1 and the resulting Grignard reagent reacted with Me$_2$SnCl$_2$, the compound (HMe$_2$SiCH$_2$CHMeCH$_2$)$_2$SnMe$_2$ is obtained. In the same manner, but employing Bu$_3$SnCl in place of the Me$_2$SnCl$_2$, there is produced the compound (HMe$_2$SiCH$_2$CHMeCH$_2$)SnBu$_3$.

*Example 7*

When Ph$_2$SnBr$_2$ is employed in place of Me$_2$SnCl$_2$ in the process of Example 1, there is produced the compound (HMe$_2$SiCH$_2$)$_2$SnPh$_2$. In like manner, the use of BuSnCl$_3$ as the tin reactant leads to the production of (HMe$_2$SiCH$_2$)$_3$SnBu.

That which is claimed is:

1. A silalkyltin compound having the formula

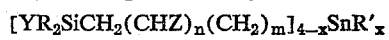

where each R is a monovalent hydrocarbon radical, each R' is selected from the group consisting of alkyl and phenyl radicals, Y is hydrogen, Z is selected from the group consisting of hydrogen and the methyl radical, $x$ is an integer of from 1 to 2 inclusive, $m$ is an integer of from 0 to 1 inclusive, and $n$ is an integer of from 0 to 1 inclusive and is 1 only when $m$ is 1.

2. A silalkyltin compound having the formula

where each R' is an alkyl radical of from 1 to 4 inclusive carbon atoms, Y is hydrogen, and Me is a methyl radical.

3. A silalkyltin compound having the formula

where each R' is an alkyl radical of from 1 to 4 inclusive carbon atoms, Y is hydrogen, and Me is a methyl radical.

4. A silalkyltin compound having the formula

where each R' is an alkyl radical of from 1 to 4 inclusive carbon atoms, and Me is a methyl radical.

5. A silalkyltin compound having the formula

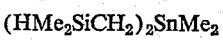

where Me represents a methyl radical.

6. A silalkyltin compound having the formula

where Me and Bu represent methyl and butyl radicals respectively.

7. A silalkyltin compound having the formula

where Me represents a methyl radical.

References Cited in the file of this patent

UNITED STATES PATENTS

| | | |
|---|---|---|
| 2,675,397 | Ramsden | Apr. 13, 1954 |
| 2,937,994 | Holdstock | May 24, 1960 |

OTHER REFERENCES

Seyferth et al.: "Journal of Organic Chemistry," 20, pp. 250–256 (1955).